United States Patent
Shknevsky et al.

(10) Patent No.: US 12,468,472 B2
(45) Date of Patent: Nov. 11, 2025

(54) END-OF-LIFE DATA PAGE PROCESSING

(71) Applicant: Dell Products L.P., Round Rock, TX (US)

(72) Inventors: Alexander Shknevsky, Fair Lawn, NJ (US); Uri Shabi, Tel Mond (IL); Vamsi K. Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/422,219

(22) Filed: Jan. 25, 2024

(65) Prior Publication Data

US 2025/0244909 A1     Jul. 31, 2025

(51) Int. Cl.
*G06F 3/06* (2006.01)

(52) U.S. Cl.
CPC .......... *G06F 3/0649* (2013.01); *G06F 3/0604* (2013.01); *G06F 3/0641* (2013.01); *G06F 3/067* (2013.01)

(58) Field of Classification Search
CPC .... G06F 3/0649; G06F 3/0604; G06F 3/0641; G06F 3/067
See application file for complete search history.

(56) References Cited

U.S. PATENT DOCUMENTS

| | | | |
|---|---|---|---|
| 10,228,858 B1 * | 3/2019 | Stoakes | G06F 3/0641 |
| 11,016,884 B2 | 5/2021 | Soukhman et al. | |
| 11,386,047 B2 | 7/2022 | Chen et al. | |
| 11,556,270 B2 | 1/2023 | Lee et al. | |
| 2003/0191783 A1 * | 10/2003 | Wolczko | G06F 12/0261 |
| 2007/0254631 A1 * | 11/2007 | Spooner | H04L 63/126 455/411 |
| 2011/0145475 A1 * | 6/2011 | Eleftheriou | G06F 12/0246 711/170 |
| 2016/0292072 A1 * | 10/2016 | Edwards | G06F 12/0261 |

OTHER PUBLICATIONS

Shabi, Uri, et al.; "Data Storage System With Automated Correction of Reference Counts in Addressing Structure to Avoid Capacity Leakage," U.S. Appl. No. 18/403,997, filed Jan. 4, 2024.

* cited by examiner

*Primary Examiner* — Ryan Bertram
(74) *Attorney, Agent, or Firm* — BainwoodHuang

(57) ABSTRACT

A method of managing end-of-life processing of data blocks includes performing a decref procedure for a chunk of data, the decref procedure decrementing reference counts for respective blocks of the chunk of data, and deferring performance of an end-of-life procedure for a plurality of blocks of the chunk of data whose reference counts become zero as a result of performing the decref procedure. The method further includes, upon performing a data consolidation procedure after performing the decref procedure, performing the end-of-life procedure on the plurality of blocks.

20 Claims, 5 Drawing Sheets

END-OF-LIFE DATA PAGE PROCESSING

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some data storage systems support block sharing, which typically arises in the context of deduplication or snapshots. For example, different data objects or portions of data objects may have certain data in common. Rather than storing a separate copy of the same data for each data object or portion, a storage system may instead store a single copy and configure metadata such that multiple logical blocks provided for the same data point to the same physical block. To keep track of block sharing, metadata provided for a physical block may store a reference count. The reference count indicates the number of logical blocks that point to, and thus share, the physical block.

Decrementing reference counts is a frequent occurrence in storage systems, as it reflects common activities of deleting and overwriting data. To this end, some systems have dedicated procedures for performing reference count decrements, i.e., "decrefs," in large numbers en masse. A decref procedure typically runs as a background process that stores newly decremented reference counts in persistent metadata.

When the reference count for a physical block reaches zero, indicating that the physical block is no longer pointed to by any logical block, the decref procedure performs end-of-life processing for that physical block. Such processing may involve deleting any entry for the physical block from a deduplication database, which associates blocks with storage locations and facilitates block matching for deduplication.

SUMMARY

Unfortunately, end-of-life processing of data blocks can be resource intensive. In order to locate an entry for a data block in a deduplication database, it may be necessary to read the block and its associated metadata from backend storage, decompress the block, and hash the block to generate a key. The key identifies the entry for the block in the deduplication database, enabling the entry to be located and deleted, and its space reclaimed. But the workload is read-intensive, especially when multiplied over large numbers of blocks. Because of the large workload involved, end-of-life processing is sometimes skipped altogether, leaving many stale entries lingering in the deduplication database.

Stale entries give rise to inefficiencies. The deduplication database may reside at least in part in high-speed memory, which is a limited and valuable resource. Leaving many stale entries in the database consumes space that could otherwise be used for valid entries. The result is that deduplication performance degrades, as fewer valid entries are available for block matching, and storage efficiency declines. To make matters worse, normal eviction procedures for the deduplication database may evict valid entries and leave invalid entries in place. What is needed, therefore, is a more efficient way of performing end-of-life processing of data blocks that is less read-intensive and is less likely to be skipped.

The above need is addressed at least in part by an improved technique for performing end-of-life processing of data blocks. The technique includes deferring end-of-life processing until a subsequent data consolidation procedure is performed. As the data consolidation procedure necessarily reads data and metadata when consolidating data, the improved technique leverages these reads for performing the end-of-life processing, thus avoiding having to perform these reads again.

Advantageously, the read-intensive activity that normally accompanies end-of-life processing is avoided, greatly reducing the time and resources needed and obviating any need to skip such processing. The efficient processing also helps to ensure that invalid deduplication entries are removed, promoting more effective deduplication and higher levels of data reduction.

Certain embodiments are directed to a method of managing end-of-life processing of data blocks. The method includes performing a decref procedure for a chunk of data, the decref procedure decrementing reference counts for respective blocks of the chunk of data, and deferring performance of an end-of-life procedure for a plurality of blocks of the chunk of data whose reference counts become zero as a result of performing the decref procedure. The method further includes, upon performing a data consolidation procedure after performing the decref procedure, performing the end-of-life procedure on the plurality of blocks.

Other embodiments are directed to a computerized apparatus constructed and arranged to perform a method of managing end-of-life processing of data blocks, such as the method described above. Still other embodiments are directed to a computer program product. The computer program product stores instructions which, when executed on control circuitry of a computerized apparatus, cause the computerized apparatus to perform a method of managing end-of-life processing of data blocks, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique of performing end-of-life processing of data blocks includes deferring such processing until a subsequent data consolidation procedure is performed. As the data consolidation procedure necessarily reads data and metadata when consolidating data, the improved technique leverages these reads for performing the end-of-life processing, thus avoiding having to perform these reads again.

Figure 1:
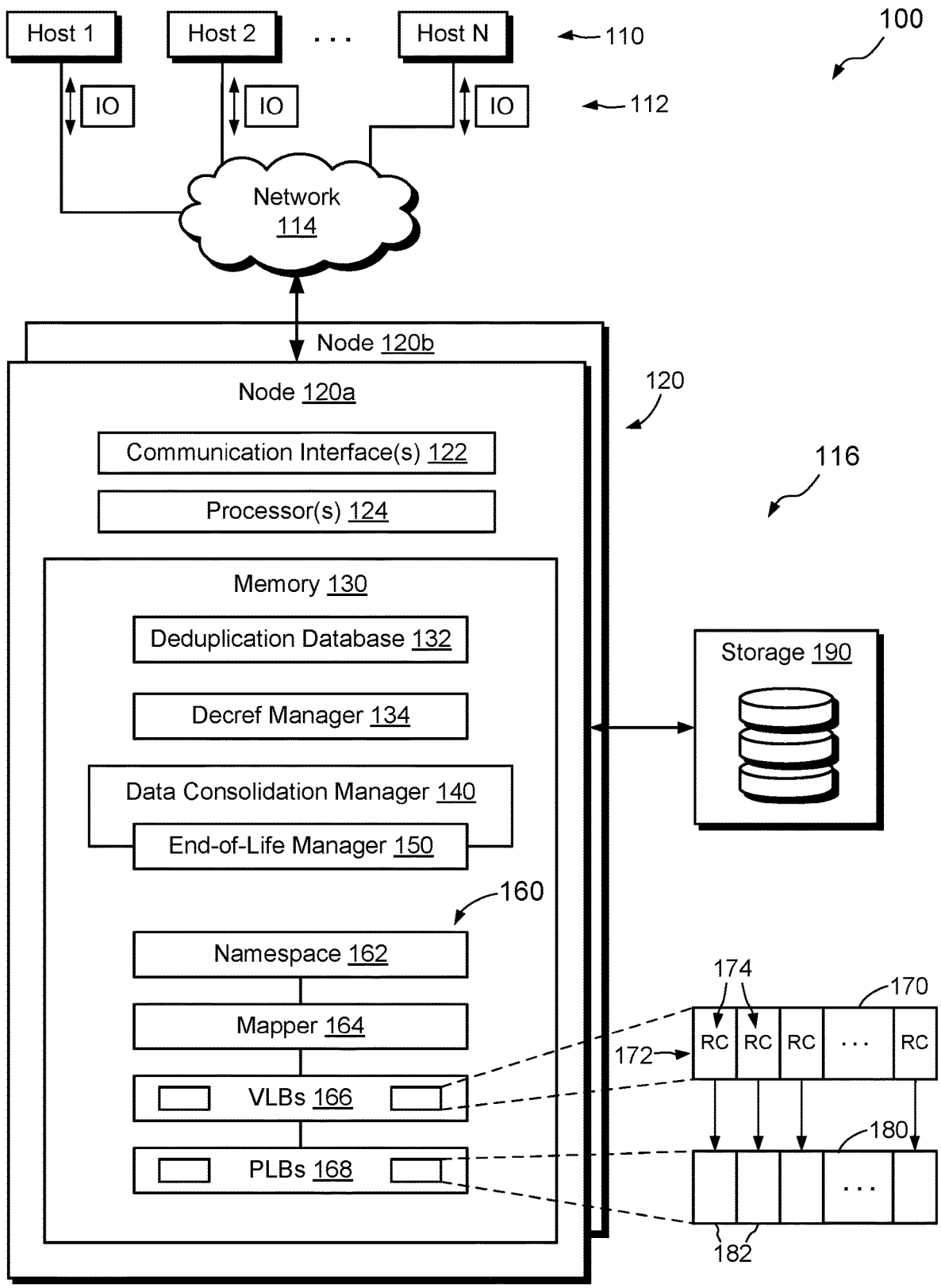
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and backend storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the backend storage 190.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions with associated data, a deduplication database 132, a decref manager 134, a data consolidation manager 140, and an end-of-life manager 150. The memory further includes a data path 160.

The deduplication database 132 is configured to associate digests of data blocks with respective storage locations where the data blocks producing those digests can be found. A "digest" is a unique or nearly unique signature of a data block, such as a hash value, computed from the data block. Digests may be used to match data blocks having the same data and to distinguish data blocks having different data. A "block" is a unit of storage space, such as 4 kB, 8 KB, or the like, which is typically the smallest unit of storage space that the storage system 116 can allocate. Another word for block is "page," and the terms "block" and "page" may be used herein interchangeably. In some examples, the deduplication database 132 is realized as a key-value store, where the key is the digest and the value is the storage location. The deduplication database 132 typically stores entries for a large number of data blocks. When a data block is provided for storage, the storage system computes a digest of the data block and performs a lookup into the deduplication database 132 based on the digest. If a matching entry is found, the storage system can avoid separate storage of the block by adjusting metadata so that a logical address of the data block points to the physical address of the matching block indicated by the matching entry in the database. Such adjustments may involve increasing a reference count associated with the matching block. Although the deduplication database 132 is shown as a memory-resident structure, it may also be found in backend storage 190. In some examples, only a portion of the deduplication database 132 is loaded into memory at a time.

The decref manager 134 is configured to run a decref procedure, which may be a background process performed out of band with I/O requests 112. For example, the storage system may accumulate many decrefs of reference counts for data blocks over time, and the decref procedure may run on a repeating basis to write accumulated reference-count changes to persistent metadata structures. In the depicted example, the persistent metadata structures that store the reference counts are "virtuals," which are explained further below, but this is merely an example.

The data consolidation manager 140 is configured to consolidate data. For example, the storage system 116 may write data contiguously to persistent storage. Over time, some of the written data may become invalid due to deletions or overwrites, creating large numbers of holes. This is particularly the case in so-called log-structured storage systems, where blocks to be changed are not overwritten in place but rather invalidated with new blocks allocated to store modified data. Data consolidation works by combining still-valid data from an old chunk of data either with new data or with still-valid data from one or more other old chunks and writing the combined results into a single new chunk, allowing the old chunk or chunks to be freed.

The end-of-life manager 150 is configured to perform end-of-life processing of data blocks associated with reference counts of zero. Such end-of-life processing may involve removing entries for data blocks with zero reference counts from the deduplication database 132, including both in-memory and persistent parts. Removing entries for data blocks requires the digests of the data blocks, as the digests are needed to locate the entries in the database. As digests typically are not persistently stored, obtaining the digests involves reading the data blocks from backend storage 190 and computing the digests.

Operation of the above-described components will be better understood with reference to the data path 160. The data path 160 provides structures for accessing data blocks in the storage system 116 and includes a namespace 162, a mapper 164, virtual large blocks (VLBs) 166, and physical large blocks (PLBs) 168. One should appreciate that the depicted data path 160 is provided merely for illustration and is not intended to be limiting.

The namespace 162 is configured to organize logical blocks in a large address space. Each logical block in the namespace 162 has a unique logical address in the address space. Different ranges of the namespace 162 may be provided for supporting data of respective data objects, such as LUNs (Logical UNits), file systems, virtual machine disks, and the like.

The mapper 164 is configured to map logical blocks in the namespace 162 to virtual blocks, also called "virtuals," in the VLBs 166. The mapper 164 may be arranged as a B+ tree that includes multiple levels of mapping pointers, such as a "top" level, a "mid" level, and a "leaf level." Mapping pointers at each level may be arranged in pages, where each page includes multiple pointers. The mapper 164 is arranged such that each logical block in the namespace 162 points to a single mapping pointer at the leaf level, and each leaf pointer points to a single virtual.

VLBs 166 are chunks of metadata that organize virtuals. A single chunk 170 of metadata (VLB) is shown to the right. The chunk 170 includes multiple virtuals 172, and each virtual 172 has an associated reference count (RC) 174. Virtuals 172 typically store other elements besides reference counts 174, such as pointers to associated physical data blocks in the PLBs 168 (shown with arrows) and lengths of the pointed-to data blocks, which are typically compressed.

PLBs 168 are chunks of data that organize physical blocks, with a single chunk 180 of data (PLB) shown to the right. In an example, each virtual 172 in VLB 170 points to a respective physical block 182 in the PLB 180. The blocks 182 are described herein as "physical," but one should appreciate that blocks 182 are themselves representations, with the actual data of the blocks 182 being located in physical media of the backend storage 190.

Although each leaf pointer of the mapper 164 points to a single virtual 172, it is also the case that multiple leaf pointers can point to the same virtual, e.g., consequent to deduplication, snapshots, and the like. When only a single leaf pointer points to a virtual 172, the reference count 174 for that virtual is one. When two leaf pointers point to a virtual, the reference count for that virtual is two, and so on. A decref operation reflects a leaf pointer (and thus a logical block) that once pointed to a virtual but no longer does so.

In example operation, hosts 110 issue I/O requests 112 to the data storage system 116. The nodes 120 receive the I/O requests 112 at the communication interfaces 122 and initiate further processing. Such processing may include reading data, writing data, modifying data, deleting data, and the like. As new data are written, old data are invalidated, creating many holes in the VLBs 166 and in the PLBs 168. Also, deletions and other activities induce many decrefs. To keep up with the accumulated decrefs, the storage system periodically invokes the decref manager 134 to run the decref procedure, which persists the decrefs for data blocks to backend storage 190. Some of the reference counts may be decremented to zero. Also, to address increasing fragmentation, the data consolidation manager 140 regularly runs the data consolidation procedure.

In accordance with improvements hereof, the end-of-life manager 150 leverages the reads of VLBs and PLBs by the data consolidation manager 140 in generating digests of blocks with reference counts that have fallen to zero. Rather than having to read the VLBs and PLBs from backend storage 190 during operation of the decref manager 134, the end-of-life manager 150 instead defers its operation until the next execution of the data consolidation manager 140, when it can access the VLBs and PLBs already in memory 130.

For example, the end-of-life manager 150 accesses a VLB 170 and scans it to identify each virtual 172 contained therein which has a reference count of zero. For each such virtual, the end-of-life manager 150 accesses the corresponding physical block 182, also in memory 130, decompresses the block, and computes a digest from the block 182. The end-of-life manager 150 may then perform a lookup for the block in the deduplication database 132 based on the computed digest. If an entry is found, the entry is deleted, thus freeing space and promoting storage efficiency. As described further below, the data consolidation manager 140 may perform its own decompression in some cases, and the end-of-life manager 150 may leverage such decompression to further reduce its own workload.

Figure 2A:
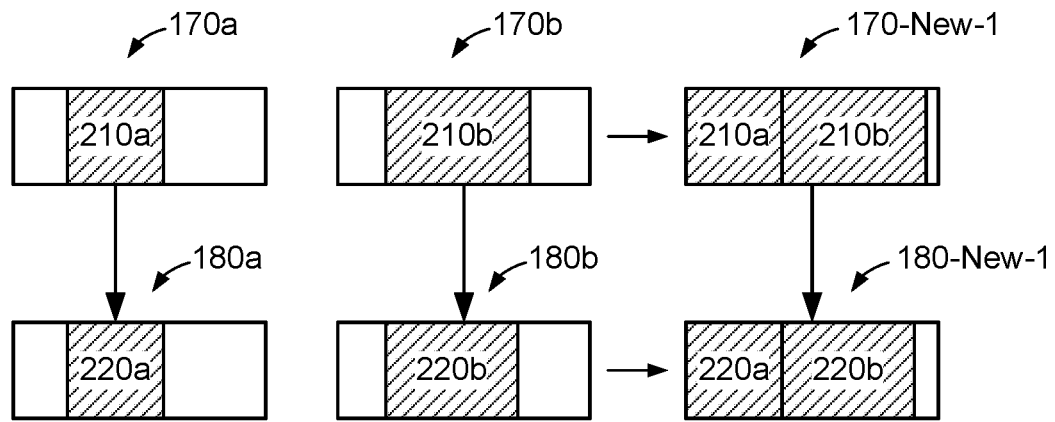
FIGS. 2a and 2b are block diagrams of example data consolidation procedures that may be performed by a data consolidation manager of FIG. 1.
Figure 2B:
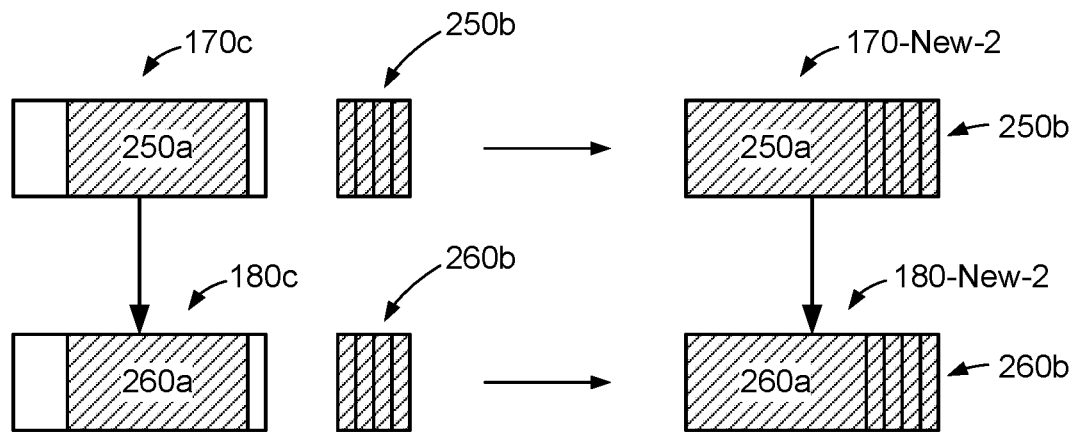

FIGS. 2a and 2b show example arrangements for performing data consolidation. As described herein, both kinds of data consolidation may be leveraged for performing end-of-life processing.

FIG. 2a shows an example of garbage collection. Here, a first chunk of metadata (VLB) 170a contains still-valid virtuals 210a (shaded), which point to still-valid physical blocks 220a (also shaded) in a first chunk of data (PLB) 180a. Unshaded portions represent invalid metadata or data. Likewise, a second chunk of metadata (VLB) 170b contains still-valid virtuals 210b, which point to still-valid physical blocks 220b in a second chunk of data (PLB) 180b. Although the shaded regions are shown as continuous ranges for simplicity, one should appreciate that still-valid virtuals and physical blocks may be distributed discontinuously within the respective VLB and PLB, with many holes among them.

Garbage collection proceeds by loading VLBs 170a and 170b and PLBs 180a and 180b from backend storage 190 into memory and allocating a new VLB 170-New-1 and a new PLB 180-New-1. The still-valid virtuals 210a and 210b are compacted and moved to the new VLB, and the still-valid physical blocks 220a and 220b are compacted and moved to the new PLB. VLBs 170a and 170b and PLBs 180a and 180b are then freed.

FIG. 2b shows an example compact-and-append procedure. Here, a chunk of metadata (VLB) 170c contains still-valid virtuals 250a, and a chunk of data (PLB) 180c contains corresponding still-valid physical blocks 260a. The storage system 116 also provides new data 260b for storage, e.g., in response to arriving write requests, and allocates new virtuals 250b for mapping the new data 260b. The compact-and-append procedure then proceeds by reading the VLB 170c and the PLB 180c into memory from backend storage 190 and allocating a new VLB 170-New-2 and a new PLB 180-New-2. The compact-and-append procedure than compacts the still-valid virtuals 250a and combines them with the new virtuals 250b, storing the combined results in the new VLB. It also compacts the still-valid physical blocks 260a and combines them with the new data 260b, storing the combined results in the new PLB. The old VLB 170c and the old PLB 180c are then freed.

The above-described data consolidation procedures, as well as similar procedures, may be leveraged by the end-of-life manager 150 to avoid having to read VLBs and PLBs into memory. For example, the end-of-life procedure may work on a per-VLB-and-PLB basis, using VLBs and PLBs that the data consolidation procedure has already loaded into memory.

Figure 3:
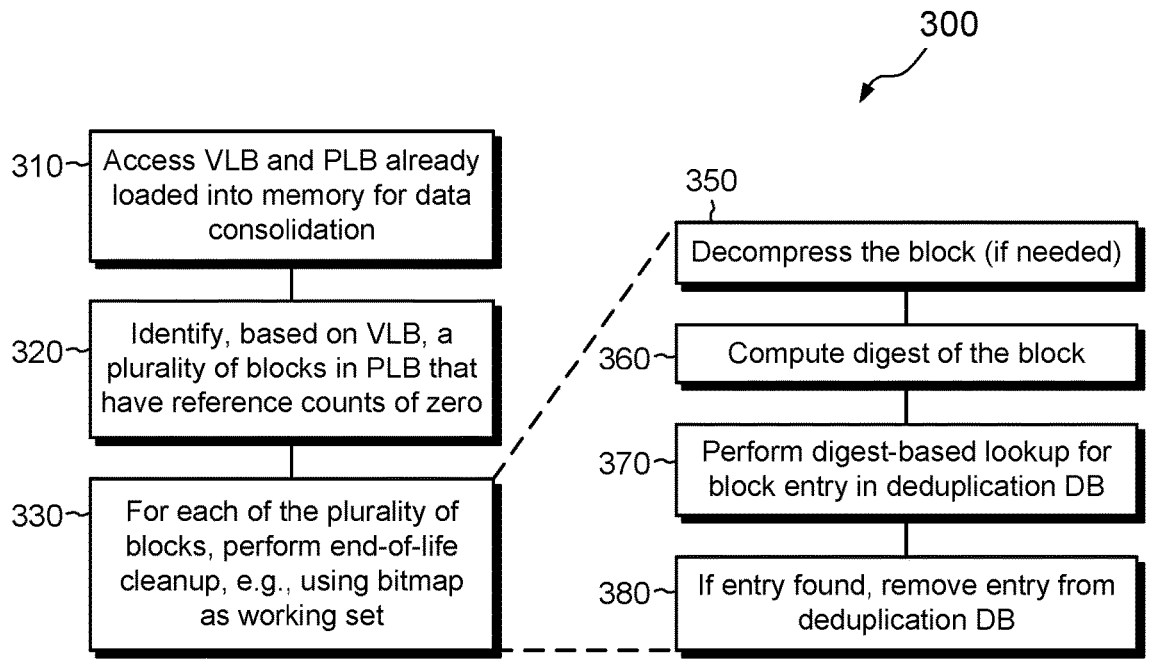
FIG. 3 is a flowchart showing an example method of performing end-of-life processing.
Figure 4:
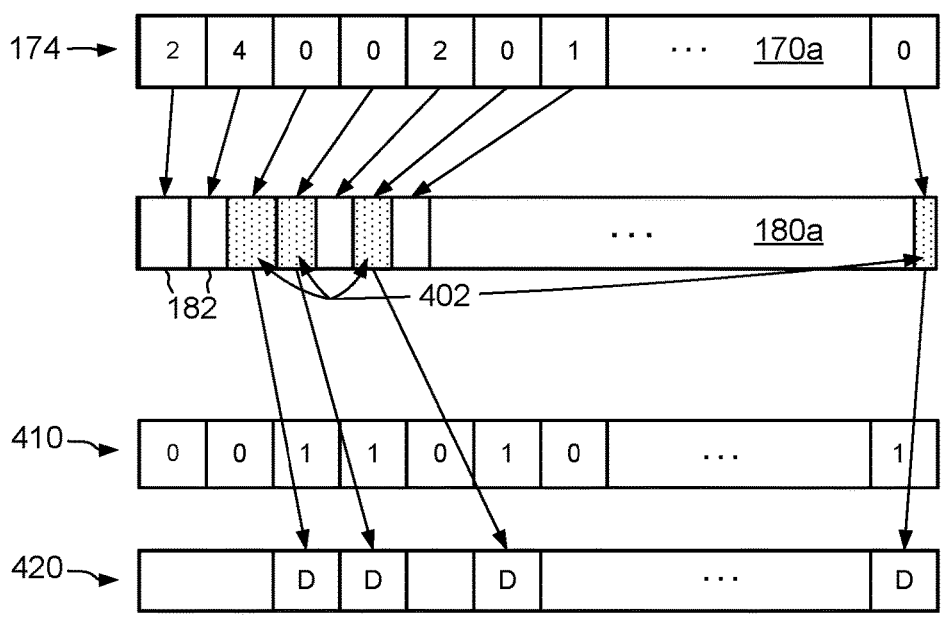
FIG. 4 is a block diagram showing example data structures involved in performing end-of-life processing.

FIGS. 3 and 4 show an example of such end-of-life processing. In FIG. 3, a method 300 of performing end-of-life processing begins at 310, where the end-of-life manager 150 accesses a VLB 170a and a PLB 180a that have already been loaded into memory for performing data consolidation. As shown in FIG. 4, the VLB 170a includes virtuals having respective reference counts 174 (e.g., 2, 4, 0, etc.).

At 320, the end-of-life manager 150 identifies, based on the VLB 170a, a plurality of blocks 402 in the PLB 180a that have reference counts of zero (see shaded physical blocks in FIG. 4). For example, the end-of-life manager 150 scans the VLB 170a and identifies each virtual having a reference count of zero. As a non-limiting example, the end-of-life manager 150 may construct a bitmap 410 (FIG. 4) that provides a bit for every virtual in the VLB 170a, setting the bit to "1" if the reference count of the virtual is zero and setting the bit to "0" if the reference count is not zero.

At 330, the end-of-life manager 150 performs end-of-life cleanup operations on each of the identified plurality of blocks 402. As shown to the right of FIG. 3, the cleanup operations may include decompressing the block (350) if needed, computing a digest of the block (360), performing a lookup for an entry that corresponds to the computed digest in the deduplication database 132 (370), and, if an entry for that digest is found, removing the entry from the deduplication database 132 (380).

In an example, the end-of-life manager 150 populates an array 420 having elements whose indices correspond to the bits in the bitmap 410. For each bit in the bitmap 410 having a value of 1, the end-of-life manager 150 stores a digest D computed from the associated data block 182. The end-of-life manager 150 may then use the bitmap 410 and array 420 as a working set when removing entries from the deduplication database 132.

In some examples, the end-of-life manager 150 may further leverage decompression activities performed by the data consolidation manager 140. Such decompression may be needed in examples in which data are compressed in multiple-block extents.

Figure 5:
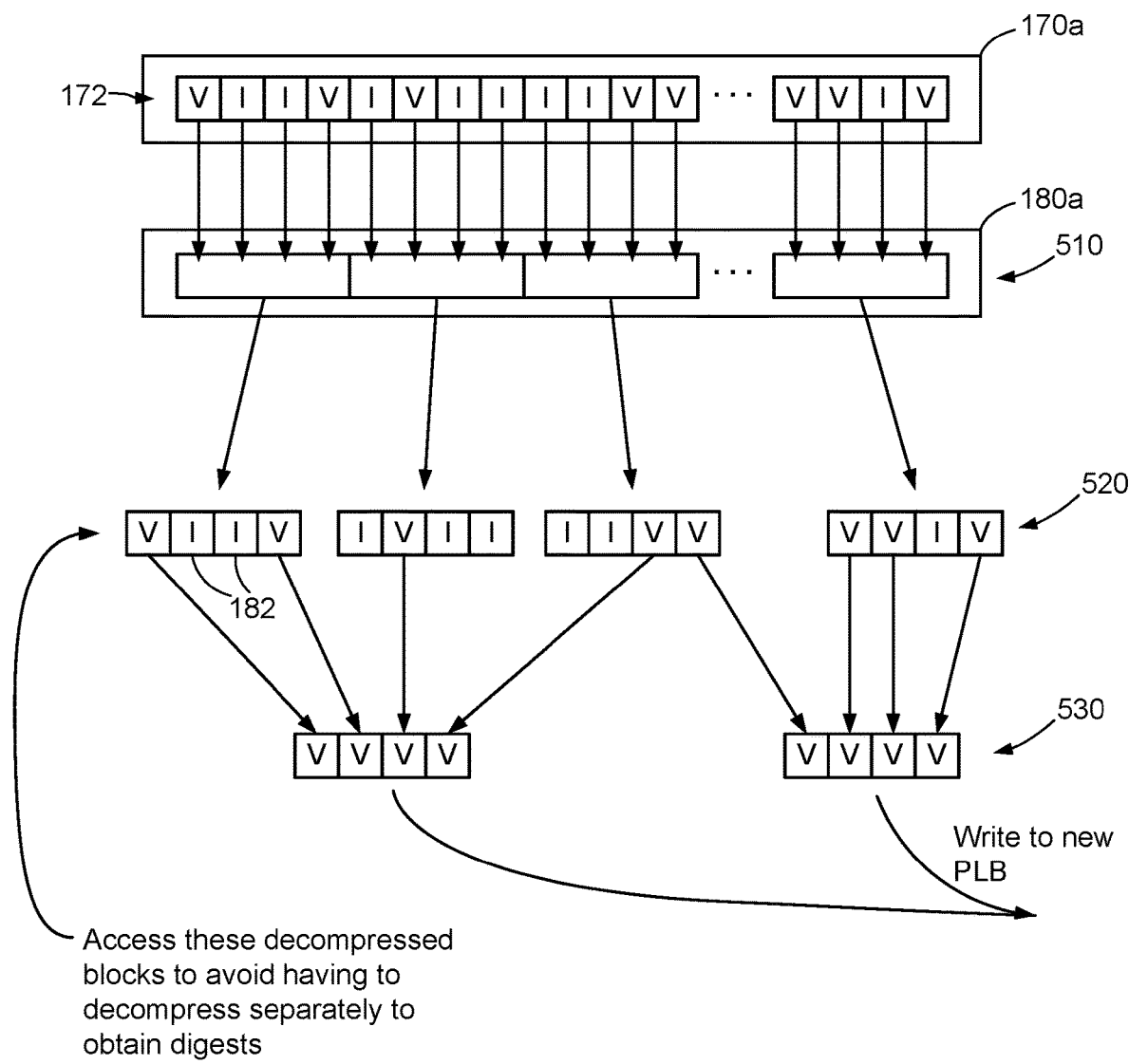
FIG. 5 is a block diagram of an example arrangement for leveraging decompression done as part of data consolidation in performing end-of-life processing.

FIG. 5 shows an example of such decompression. Here, consider again the VLB 170a and the PLB 180a described above. When consolidating data, the data consolidation manager 140 checks each virtual 172 in VLB 170a to determine whether the virtual points to valid (V) or invalid (I) data. In some examples, valid and invalid data are distinguished based on reference counts, e.g., valid data for reference counts greater than zero and invalid data for reference counts equal to zero, or by other means, such as a separate validity bit.

In this example, rather than each physical block 182 being directly accessible, multiple physical blocks 182 are compressed together into extents 510. The example shows four physical blocks 182 per extent 510, but different numbers of blocks per extent may be used, such as 2, 8, 16, etc. Combining blocks into larger extents 510 in this manner promotes higher compression ratios, but it also means that separating valid blocks from invalid blocks requires decompressing the extents 510. Decompressed extents 520 are shown. Once the extents 510 have been decompressed, the valid and invalid blocks may be separated easily. The still-valid blocks (V) may be aggregated into new extents 530, which may be written to a new PLB in the usual way (FIGS. 2a and 2b).

Given that decompression is necessary for data consolidation in this example, the end-of-life manager 150 may leverage this decompression to avoid having to separately decompress physical blocks for the purpose of computing their digests (act 350 of FIG. 3). Rather, the decompressed blocks are already available in memory. As a further optimization, the nodes 120 may be equipped with specialized chips that perform digest calculations in hardware, and thus at high speed. Using the already-decompressed blocks and the specialized chips further reduces the workload involved with end-of-life processing.

Figure 6:
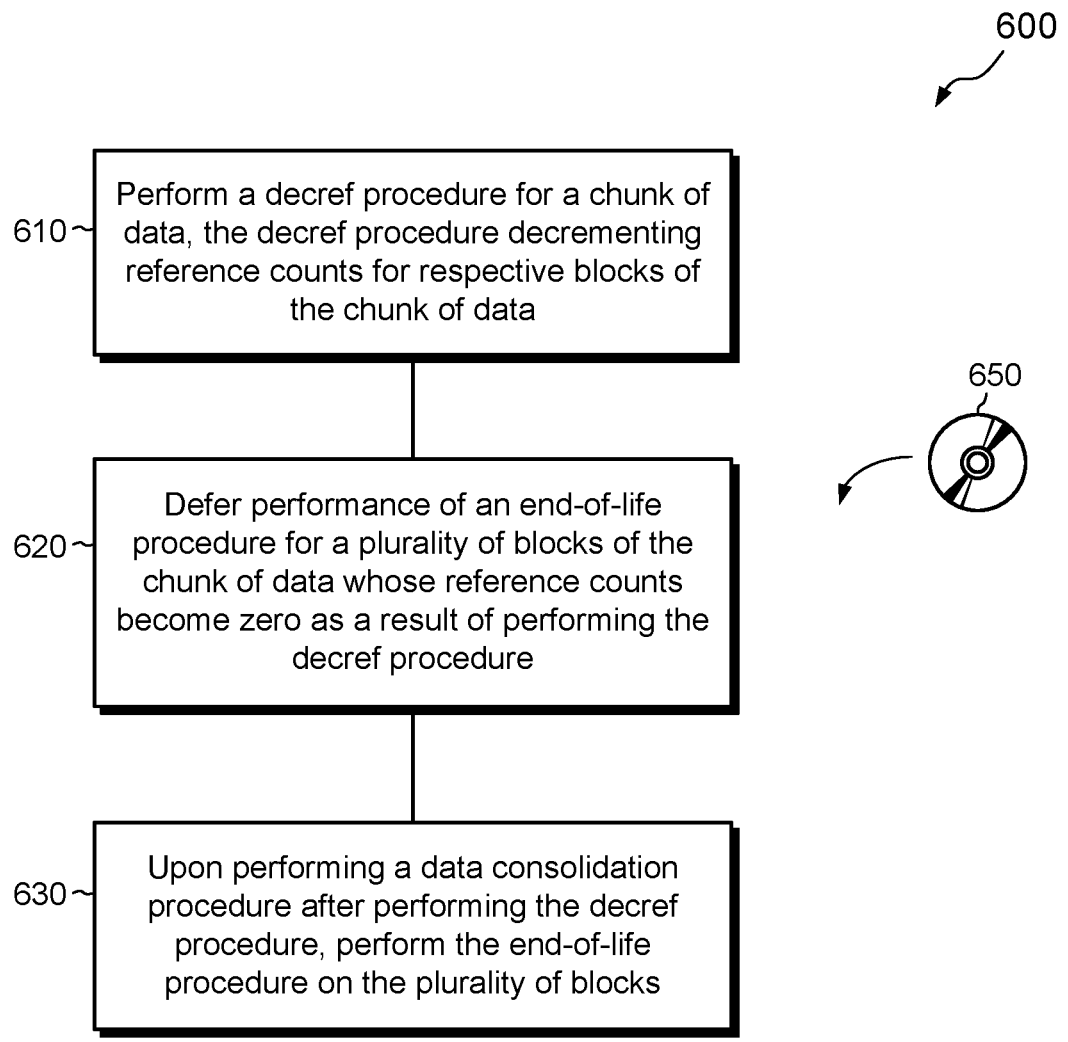
FIG. 6 is a flowchart showing an example method of managing end-of-life processing of data blocks.

FIG. 6 shows an example method 600 that may be carried out in connection with the environment 100 and provides an overview of some of the features described above. The method 600 is typically performed, for example, by the software constructs described in connection with FIG. 1, which reside in the memory 130 of a node 120 and are run by the set of processors 124. The various acts of method 600 may be ordered in any suitable way. Accordingly, embodiments may be constructed in which acts are performed in orders different from that illustrated, which may include performing some acts simultaneously.

At 610, a decref procedure is performed by a decref manager 134 for a chunk of data 180, such as a PLB. The decref procedure decrements reference counts 174 for respective blocks 182 of the chunk of data 180.

At 620, an end-of-life manager 150 defers performance of an end-of-life procedure for a plurality of blocks 402 of the chunk of data 180 whose reference counts 174 become zero as a result of performing the decref procedure.

At 630, upon performing a data consolidation procedure (FIGS. 2a and 2b) after performing the decref procedure, the end-of-life manager 150 performs the end-of-life procedure on the plurality of blocks 402.

An improved technique for performing end-of-life processing of data blocks includes deferring end-of-life processing until a subsequent data consolidation procedure is performed. As the data consolidation procedure necessarily reads data and metadata when consolidating data, the improved technique leverages these reads for performing the end-of-life processing, thus avoiding having to perform these reads again.

Having described certain embodiments, numerous alternative embodiments or variations can be made. For example, although the disclosed chunks of data and chunks of metadata have been described as PLBs and VLBs, respectively, these are merely examples. Alternatively, the disclosed technique may be performed with other aggregations of data and/or metadata besides PLBs and VLBs, such as other structures for organizing physical and/or virtual blocks.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing end-of-life processing of data blocks, comprising:
performing a decref procedure for a chunk of data, the decref procedure decrementing reference counts for respective blocks of the chunk of data;
deferring performance of an end-of-life procedure for a plurality of blocks of the chunk of data whose reference counts become zero as a result of performing the decref procedure; and
upon performing a data consolidation procedure on the chunk of data after performing the decref procedure, performing the end-of-life procedure on the plurality of blocks,
wherein performing the end-of-life procedure includes accessing the chunk of data and an associated chunk of metadata that are already in memory for performance of the data consolidation procedure, without having to load the chunk of data or the chunk of metadata separately from persistent storage.

2. The method of claim 1,
wherein performing the data consolidation procedure includes loading both the chunk of data and the associated chunk of metadata into memory from persistent storage, the chunk of metadata storing the reference counts of the blocks of the chunk of data, the chunk of data and the chunk of metadata being in memory enabling the data consolidation procedure to consolidate the chunk of data into a new chunk of data.

3. The method of claim 2, wherein performing the data consolidation procedure includes combining still-valid blocks from the chunk of data with still-valid blocks from at least one other chunk of data and placing the combined blocks into the new chunk of data.

4. The method of claim 2, wherein performing the data consolidation procedure includes combining still-valid blocks from the chunk of data with new blocks of data and placing the combined blocks into the new chunk of data.

5. The method of claim 2, wherein performing the end-of-life procedure includes:
identifying the plurality of blocks based on the reference counts in the chunk of metadata;
computing digests of the blocks of the plurality of blocks;
performing lookups for entries in a deduplication database based on the computed digests; and
for one or more entries located by performing the lookups, removing said one or more entries from the deduplication database.

6. The method of claim 5, wherein identifying the plurality of blocks includes scanning the reference counts in the chunk of metadata and constructing a bitmap that associates blocks having reference counts of zero with associated digests.

7. The method of claim 5, wherein the deduplication database is maintained at least in part in memory, such that removing said one or more entries from the deduplication database frees portions of memory such that those portions are able to store new entries.

8. The method of claim 5, wherein the plurality of blocks includes multiple compressed blocks, and wherein performing the end-of-life procedure further includes decompressing the compressed blocks before computing the digests of those blocks.

9. The method of claim 8,
wherein performing the data consolidation procedure includes decompressing multiple extents of the chunk of data, each of the extents including multiple blocks, and, for at least one of the extents, identifying invalid blocks within the extent, recompressing data of the extent without the invalid blocks, and writing the recompressed data of the extent to the new chunk of data, and wherein computing the digest of each block is based on a decompressed extent that was decompressed as part of the data consolidation procedure for at least a subset of the plurality of blocks.

10. A computerized apparatus, comprising control circuitry that includes a set of processors coupled to memory, the control circuitry constructed and arranged to:

perform a decref procedure for a chunk of data, the decref procedure decrementing reference counts for respective blocks of the chunk of data;

defer performance of an end-of-life procedure for a plurality of blocks of the chunk of data whose reference counts become zero as a result of performing the decref procedure; and upon performing a data consolidation procedure on the chunk of data after performing the decref procedure, perform the end-of-life procedure on the plurality of blocks, wherein the control circuitry constructed and arranged to perform the end-of-life procedure is further constructed and arranged to access the chunk of data and an associated chunk of metadata that are already in memory for performance of the data consolidation procedure, without having to load the chunk of data or the chunk of metadata separately from persistent storage.

11. The computerized apparatus of claim 10, wherein the control circuitry constructed and arranged to perform the data consolidation procedure is further constructed and arranged to load both the chunk of data and the associated chunk of metadata into memory from persistent storage, the chunk of metadata storing the reference counts of the blocks of the chunk of data, the chunk of data and the chunk of metadata being in memory enabling the data consolidation procedure to consolidate the chunk of data into a new chunk of data.

12. A computer program product including a set of non-transitory, computer-readable media having instructions which, when executed by control circuitry of a computerized apparatus, cause the computerized apparatus to perform a method of managing end-of-life processing of data blocks, the method comprising:

performing a decref procedure for a chunk of data, the decref procedure decrementing reference counts for respective blocks of the chunk of data;

deferring performance of an end-of-life procedure for a plurality of blocks of the chunk of data whose reference counts become zero as a result of performing the decref procedure; and upon performing a data consolidation procedure on the chunk of data after performing the decref procedure, performing the end-of-life procedure on the plurality of blocks, wherein performing the end-of-life procedure includes accessing the chunk of data and an associated chunk of metadata that are already in memory for performance of the data consolidation procedure, without having to load the chunk of data or the chunk of metadata separately from persistent storage.

13. The computer program product of claim 12, wherein performing the data consolidation procedure includes loading both the chunk of data and the associated chunk of metadata into memory from persistent storage, the chunk of metadata storing the reference counts of the blocks of the chunk of data, the chunk of data and the chunk of metadata being in memory enabling the data consolidation procedure to consolidate the chunk of data into a new chunk of data.

14. The computer program product of claim 13, wherein performing the data consolidation procedure includes combining still-valid blocks from the chunk of data with still-valid blocks from at least one other chunk of data and placing the combined blocks into the new chunk of data.

15. The computer program product of claim 13, wherein performing the data consolidation procedure includes combining still-valid blocks from the chunk of data with new blocks of data and placing the combined blocks into the new chunk of data.

16. The computer program product of claim 13, wherein performing the end-of-life procedure includes:

identifying the plurality of blocks based on the reference counts in the chunk of metadata;

computing digests of the blocks of the plurality of blocks;

performing lookups for entries in a deduplication database based on the computed digests; and for one or more entries located by performing the lookups, removing said one or more entries from the deduplication database.

17. The computer program product of claim 16, wherein identifying the plurality of blocks includes scanning the reference counts in the chunk of metadata and constructing a bitmap that associates blocks having reference counts of zero with associated digests.

18. The computer program product of claim 16, wherein the deduplication database is maintained at least in part in memory, such that removing said one or more entries from the deduplication database frees portions of memory such that those portions are able to store new entries.

19. The computer program product of claim 16, wherein the plurality of blocks includes multiple compressed blocks, and wherein performing the end-of-life procedure further includes decompressing the compressed blocks before computing the digests of those blocks.

20. The computer program product of claim 19, wherein performing the data consolidation procedure includes decompressing multiple extents of the chunk of data, each of the extents including multiple blocks, and, for at least one of the extents, identifying invalid blocks within the extent, recompressing data of the extent without the invalid blocks, and writing the recompressed data of the extent to the new chunk of data, and wherein computing the digest of each block is based on a decompressed extent that was decompressed as part of the data consolidation procedure for at least a subset of the plurality of blocks.

* * * * *